United States Patent
Koshishiba et al.

(10) Patent No.: US 6,831,998 B1
(45) Date of Patent: Dec. 14, 2004

(54) INSPECTION SYSTEM FOR CIRCUIT PATTERNS AND A METHOD THEREOF

(75) Inventors: Hiroya Koshishiba, Chigasaki (JP); Hideaki Doi, Tokyo (JP); Mitsunobu Isobe, Machida (JP); Kazushi Yoshimura, Kamakura (JP); Haruomi Kobayashi, Yokohama (JP); Chie Shishido, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 482 days.

(21) Appl. No.: 09/598,652

(22) Filed: Jun. 22, 2000

(51) Int. Cl.$^7$ ................................................ G06K 9/00
(52) U.S. Cl. .................. 382/147; 382/149; 382/304; 356/237.1; 361/719
(58) Field of Search ................................ 382/149, 312, 382/318, 324, 304, 305, 147; 250/540, 548, 310, 307; 356/369, 364, 237.1, 237.4; 361/719, 722, 807

(56) References Cited

U.S. PATENT DOCUMENTS

| | | | |
|---|---|---|---|
| 4,644,172 A | * | 2/1987 | Sandland et al. ........... 250/548 |
| 5,440,648 A | * | 8/1995 | Roberts et al. ............. 382/141 |
| 5,795,306 A | * | 8/1998 | Shimotani et al. .......... 600/558 |
| 5,905,563 A | * | 5/1999 | Yamamoto .................. 351/210 |
| 6,020,957 A | * | 2/2000 | Rosengaus et al. ....... 356/237.4 |
| 6,107,637 A | * | 8/2000 | Watanabe et al. ........ 250/559.3 |
| 6,347,150 B1 | * | 2/2002 | Hiroi et al. ................. 382/149 |
| 6,507,779 B2 | * | 1/2003 | Breed et al. .................. 701/45 |

FOREIGN PATENT DOCUMENTS

| | | |
|---|---|---|
| JP | 59-41847 | 3/1984 |
| JP | 5941847 | 3/1984 |
| JP | 2170279 | 7/1990 |
| JP | 2-170279 | 7/1990 |
| JP | 05-249047 | 9/1993 |
| JP | 6222012 | 8/1994 |
| JP | 814859 | 1/1996 |
| JP | 8278256 | 10/1996 |
| JP | 09-034529 | 2/1997 |

* cited by examiner

Primary Examiner—Bhavesh M. Mehta
Assistant Examiner—Sheela Chawan
(74) Attorney, Agent, or Firm—Antonelli, Terry, Stout & Kraus, LLP (57) ABSTRACT

In order to provide a high-speed, inexpensive inspection system that has a short development period, that is flexible, and that allow algorithms to be easily changed, a PC equipped with an image input feature is used to capture an image detected by a line image sensor, this detected image is transferred to a plurality of PCs connected by a LAN, and defects are detected using software processing on the plurality of PCs.

8 Claims, 6 Drawing Sheets

FIG.6

INSPECTION SYSTEM FOR CIRCUIT PATTERNS AND A METHOD THEREOF

BACKGROUND OF THE INVENTION

The present invention relates to a technology for performing high-speed, automatic inspection of the appearance of industrial products. More specifically, the present invention relates to a system for inspecting fine circuit patterns on an electronic circuit substrate and an inspection method thereof.

Japanese laid-open patent publication number Hei 2-170279 discloses an example of a conventional pattern inspection system. In this type of conventional inspection system, a line image sensor (linear image sensor) is used to detect circuit patterns, and defects are detected by performing image processing on the detected image data using dedicated circuitry such as alignment circuits and image differential detection circuits.

In this conventional inspection sensor, the process of finding defects from an image detected with a line image sensor is performed with hardware through dedicated electronic circuitry. This can be done at very high speeds since hardware processing is used. On the other hand, the need for designing and producing dedicated electronic circuitry also means slower development and high development costs. Furthermore, if the algorithm used to detect defects is improved, making the corresponding changes to the circuit substrates is difficult.

SUMMARY OF THE INVENTION

The object of the present invention is to implement an inspection system that reduces the development time and development costs for inspection systems and that allows the evaluation processing algorithm to be changed easily.

In order to achieve the object described above, the present invention uses a PC equipped with an image input feature to capture images detected by a line image sensor. The detected images are transferred to a plurality of PCs connected by a local area network (LAN), and defects are detected through software processing on the plurality of PCs. Using general-purpose PCs for this provides the following advantages.

Since individual PCs are inexpensive, using multiple units will still be less expensive than designing and producing dedicating electronic circuitry, and development time can be reduced as well. Since processing is done in software, there is a high degree of flexibility and changes in algorithms can be implemented easily. Furthermore, even for other inspections that perform different types of evaluation processing, the same system architecture can be used, and only the software needs to be changed. Also, since there has been very rapid improvements in PCs, inspections can be made faster by replacing the PCs with the newest models.

The system according to present invention is not restricted to the use of PCs for the capturing/transfer of detected images and detecting of defects. Other small-scale computers can also be used such as workstations and servers.

These and other objects, features and advantages of the invention will be apparent from the following more particular description of preferred embodiments of the invention, as illustrated in the accompanying drawings.

DESCRIPTION OF THE PREFERRED EMBODIMENTS

The following is a description, with references to the drawings, of the embodiments of the present invention.

Figure 1:
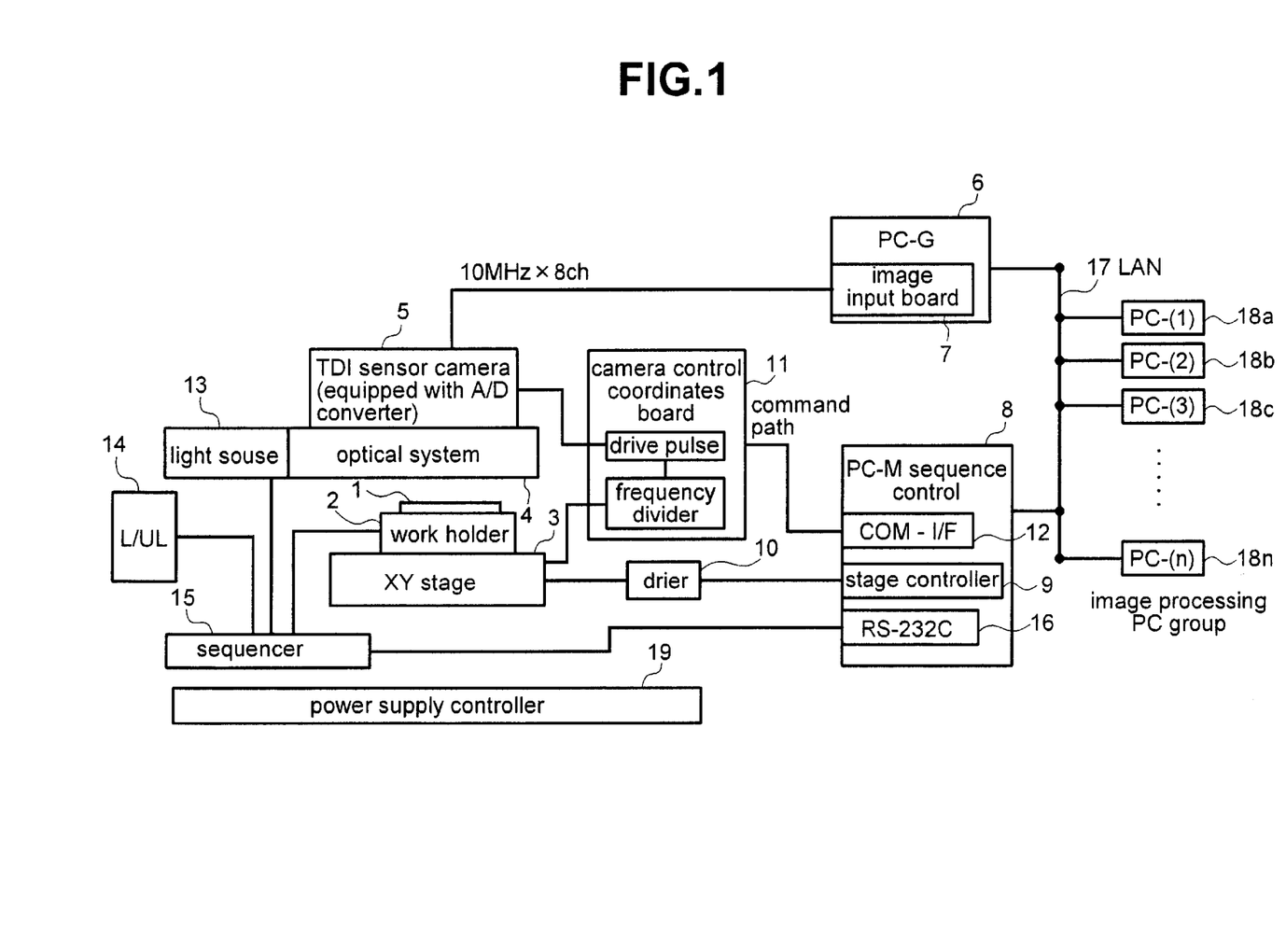
FIG. 1 is a drawing showing the architecture of an inspection system (defect inspection system) according to a first embodiment of the present invention.

FIG. 1 is a drawing showing the architecture of an inspection system (defect inspection system) according to a first embodiment of the present invention.

In the architecture shown in FIG. 1, an inspected object 1 such as an electronic circuit substrate is supported on a work holder 2 fixed on top of an XY stage 3. The inspected area of the inspected object 1 is successively changed by movements of the XY stage 3. An optical system 4 includes an illuminating optical system illuminating the inspected area of the inspected object 1 and an imaging optical system forming an optical image using the light (e.g., reflected light and diffuse light) from the inspected area. A line image sensor takes the optical image formed on the line (linear) image sensor of a line (linear) sensor camera 5 by the imaging optical system and converts this to an image signal.

A standard CCD linear image sensor can be used for line image sensor that performs image detection in the line sensor camera 5. However, in this embodiment, a TDI (Time Delay & Integration) line image sensor (TDI sensor) is used for high-sensitivity image detection with high-speed relative scanning, thus providing image detection through high-speed scanning and allowing high-sensitivity image detection even with low illumination. The line sensor camera 5, which is equipped with an amplifier and an A/D converter, performs A/D conversion of the output from the line image sensor and outputs a digitized image signal.

Using a multiple output (parallel output) line sensor camera 5 provides the advantage of improving the processing speed for data transfers. For example, if a TDI line sensor camera equipped with an 8-output A/D converter is used to output an 8-bit (256 levels) grayscale image at a 10 MHz data transfer rate through 8 channels, then the total data transfer rate would be 80 MHz. If a line sensor camera 5 with a single output (serial output) is used, the data transfer rate would be approximately 5–30 MHz. Using an n-output line sensor camera 5 will increase the data transfer rate by a factor of n. Thus, the data transfer rate with 8 outputs is 40 MHz–240 MHz, and with 16 outputs is 80 MHz–480 MHz.

The digitized image signal from the line sensor camera 5 is sent to a PC (PC-G) 6 used for receiving images. This PC 6 is equipped with an image input board 7. The image signal goes through the image input board 7 connected to a bus of the PC 6 and is entered into the main memory of the PC 6 as a digital image.

When using a single-output line sensor camera 5 with a data transfer rate of approximately 20 MHz or less, a commercial PC image input board can be used for the image input board 7. However, when using a multiple output line sensor camera 5 with a high data transfer rate, use of currently available commercial image input boards is difficult, and a high-speed image input board is necessary. Of course, this type of image input board capable of high-speed transfers can be used in the image input PC (PC-G) 6. However, with a multiple output line sensor camera 5 with a high data transfer rate, it would also be possible to perform image input with a plurality of PCs 6, assigning one or two channels to each image input PC 6.

In FIG. 1, PC (PC-M) 8 is a PC used for sequence control. PC 8 handles overall administration of the entire system and provides unified control of the inspection sequence in the system.

The PC 8 sends a command signal from its stage controller section (motor control substrate) 9 to a driver 10. The driver 10 controls the motor used to drive the stage, thus controlling movement of the XY stage 3 (the Y stage and the X stage). This allows bands of images to be detected while the Y stage is moved at a fixed speed in a direction (along the y axis) perpendicular to the arrangement of pixels in the line image sensor. The entire surface of the inspected object 1 is detected by moving the Y stage back and forth. Each time the Y stage changes direction, the X stage is moved in incremental steps equal to the detection width.

An output pulse from an encoder connected directly to the shaft of a servo motor used to drive the stage is sent to a camera control/coordinates management board 11. In the board 11, frequency division is performed on the encoder pulse, a pulse for driving the line image sensor is generated, and this is sent to the line image sensor. Also, by counting the pulse from the encoder, the board 11 manages position information for the XY stage 3. A trigger signal is generated based on the position information at the image detection starting point, and this is sent to the image input board 7 of the PC 6. Commands sent to the board 11 are issued by the PC 8 through a command interface board 12.

The image data sent to the image input PC 6 is selected/distributed appropriately by the PC 6 and sent to PCs 18a, 18b, ... 18n of an image processing PC group connected by a LAN (local area network) 17. The image processing PCs 18a–18n operate in parallel to detect defects from the detected image data. The results of the processing (e.g., defect positions, size, type) performed by the PC group 18a–18n are sent through the LAN 17 to the sequence controller PC 8. The inspection results are sent to a printer connected to the PC 8 or are transferred through the network to a computer external to the inspection system. It would also be possible to use the image processing PC group 18a–18n not only for defect detection but also for categorizing details and evaluating criticality of the defects.

The sequencer 15, managed by the sequence controller PC 8, controls the work holder 2, the illumination light source 13, and a loader/unloader 14, which loads and unloads the inspected object 1 on the work holder 2. The sequencer communicates with the PC 8 through a serial port 16 and operates in response to commands from the PC 8. Power to all the devices in the inspection system, except for at least the PCs, is supplied by a power supply controller 19.

Figure 2:
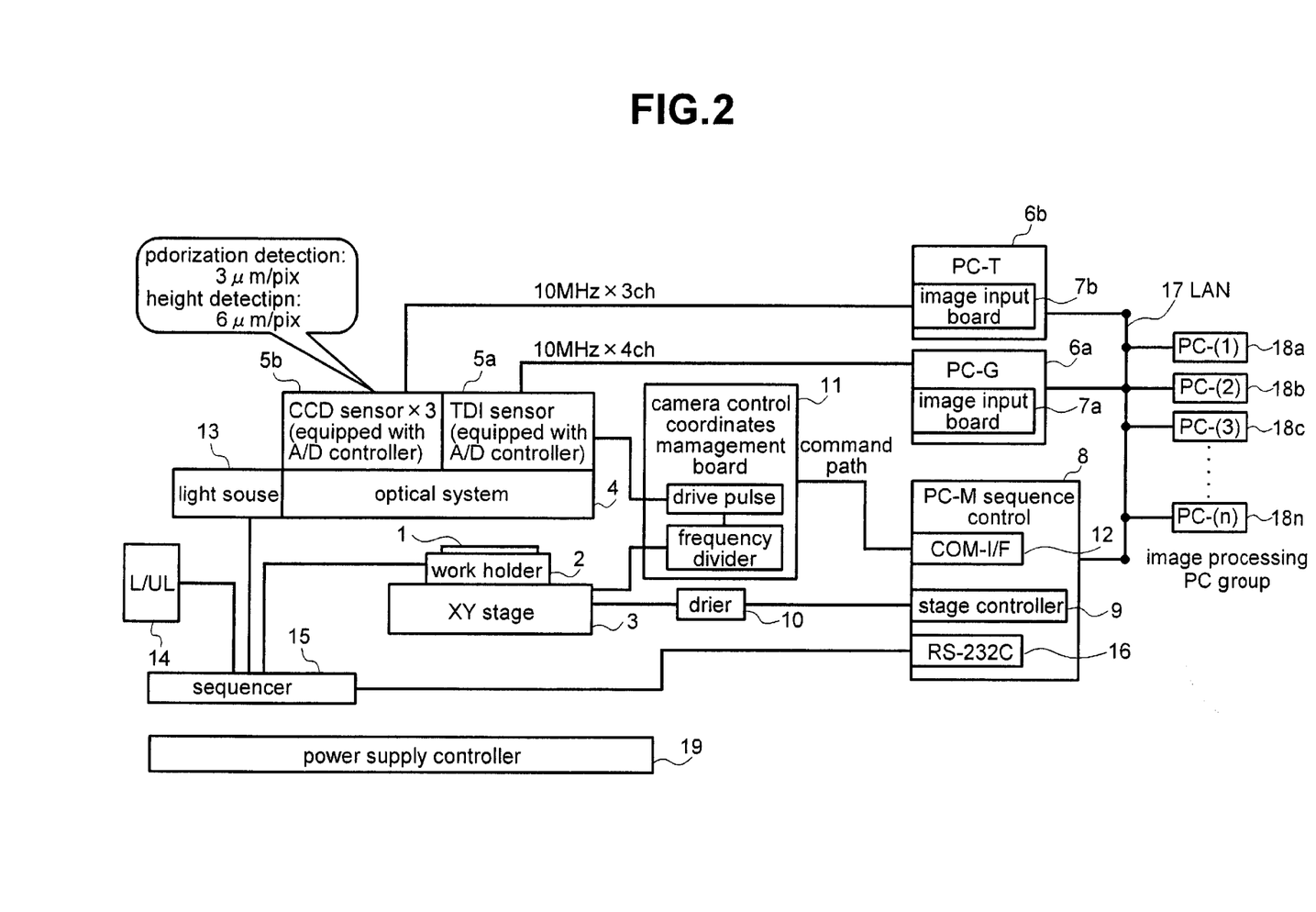
FIG. 2 is a drawing showing the architecture of an inspection system (defect inspection system) according to a second embodiment of the present invention.

FIG. 2 is a drawing showing the architecture of an inspection system (defect inspection system) according to a second embodiment of the present invention. In this embodiment, a height information image is used along with a flat image in order to inspect for defects in the inspected object 1. Thus, thickness of the circuit patterns on the electronic circuit substrate serving as the inspected object 1 is inspected along with the planar shape of the circuit pattern.

The inspected object 1 is supported on the work holder 2 fixed on the XY stage 3. The optical system 4 includes a flat image detection system and a height detection system. The flat image detection system includes: an illumination optical system providing polarized illumination to detect patterns as dark areas and the substrate as light areas; and an imaging optical system forming an optical image by detecting polarized light. The height detection system includes an illuminating optical system and an imaging optical system forming an optical image.

The optical image for the flat image detection system is detected by a TDI sensor camera 5a. The optical image for the height detection system is detected by a CCD linear image sensor camera 5b equipped with three CCD linear image sensor cameras positioned at the focal position and positions ahead of and behind the focal position. For example, if the flat image has a pixel size of 3 microns and a TDI sensor camera equipped with a 4-output A/D converter is used to output an 8-bit grayscale image at a data transfer rate of 10 MHz, the total data transfer rate would be 40 MHz. The image for the height-detection system is an integer multiple of the flat image pixel size, and would have a pixel size of 6 microns using a factor of 2. If the CCD linear image sensors output images at a data transfer rate of 10 MHz, the total data transfer rate would be 30 MHz.

The digitized flat image signal is captured by a first image input PC (PC-G) 6a. The three digitized image signals from the height detection system are captured by a second image input PC (PC-T) 6b. The PCs 6a, 6b are equipped with image input boards 7a, 7b, respectively. The image signals pass through the image input boards 7a, 7b, which are connected to the busses of the PCs 6a, 6b, and are captured as digital images in the main memories of the PCs 6a, 6b.

The sequence controller PC (PC-M) 8 send command signals from the stage controller (motor control board) 9 to the driver 10. The driver 10 drives the motor used for driving the stage, thus controlling the movements of the XY stage 3 (the Y stage and the X stage). This allows bands of images to be detected while the Y stage is moved at a fixed speed in a direction (along the y axis) perpendicular to the arrangement of pixels in the line image sensor. The entire surface of the inspected object 1 is detected by moving the Y stage back and forth. Each time the Y stage changes direction, the X stage is moved in incremental steps equal to the detection width.

An output pulse signal from a rotary encoder in the servo motor for the Y stage is sent to a camera control/coordinates management board 11. The board 11 performs frequency division on the encoder pulse using a clock setting corresponding to the detection pixel size. The resulting signal is sent to the CCD linear image sensors and the TDI sensor as drive pulses. A pulse is sent to the CCD linear image sensors each time the Y stage moves by 6 microns, and a pulse is sent to the TDI sensor each time the Y stage moves by 3 microns. This allows the sensors to be driven in synchronization with the stage speed.

By counting the encoder pulses, the board 11 manages position information for the XY stage 3 [?stage 3?]. Trigger signals are generated based on this position information at the point where image detection is to begin. These trigger signals are sent to the image input boards 7a, 7b of the PCs 6a, 6b. Commands to the board 11 are issued by the PC 8 through the command interface board 12.

The images sent to the image input PCs 6a, 6b are selected and distributed appropriately by the PCs 6a, 6b to the image processing PC group 18a, 18b, . . . 18n, which are connected by a LAN 17. The image processing PC group 18a–18n generate a height information image from the three images detected by the height detection system, and performs defect evaluation/detection operations based on this height information image data and the flat image data. The results of the operations performed by the PC group 18a–18n are sent through the LAN 17 to the sequence controller PC 8.

The sequencer 15, managed by the sequence controller PC 8, controls the work holder 2, the illumination light source 13, and the loader/unloader 14. The sequencer communicates with the PC 8 through a serial port 16 and operates in response to commands from the PC 8. Power to all the devices in the inspection system, except for at least the PCs, is supplied by a power supply controller 19.

Figure 3:
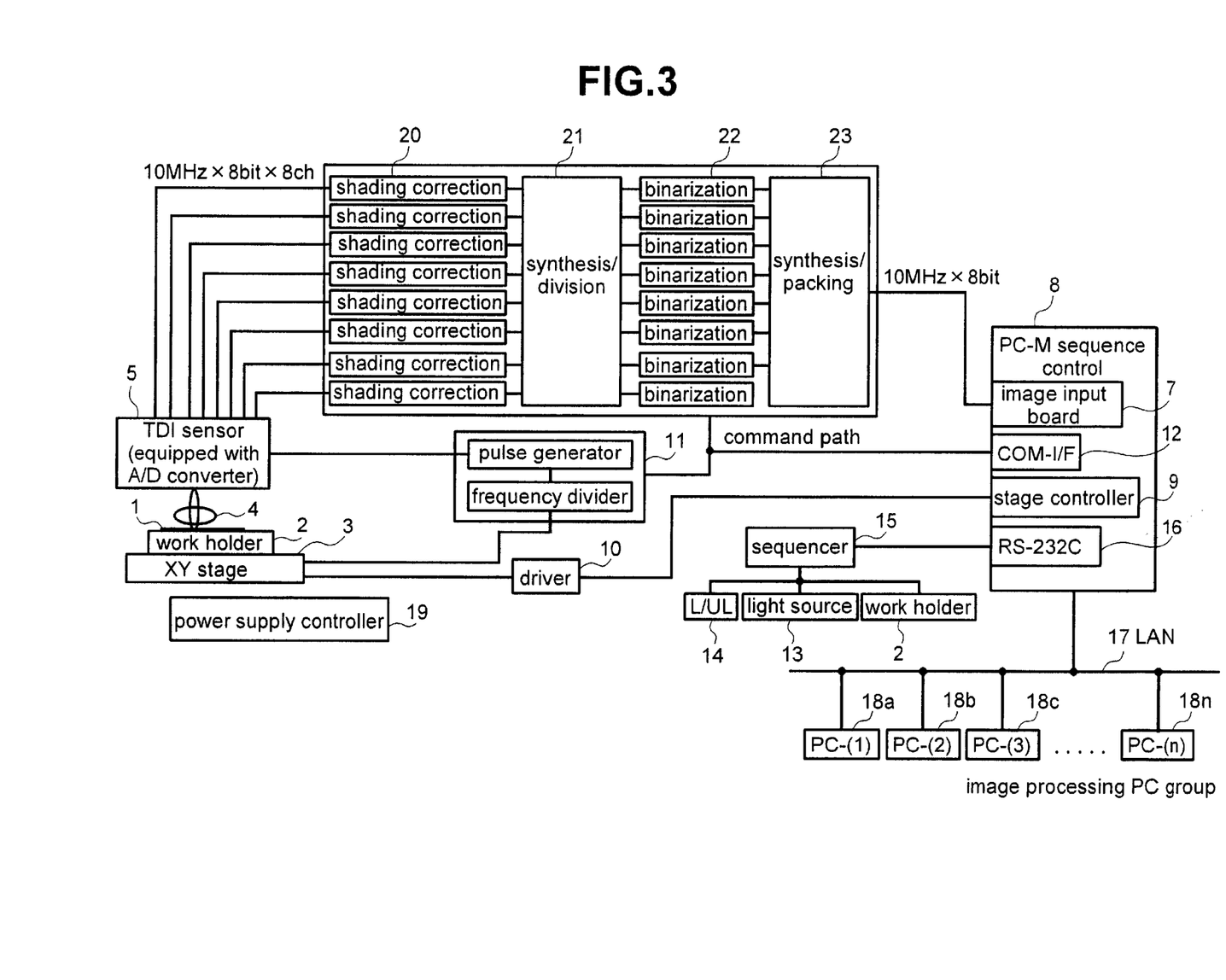
FIG. 3 is a drawing showing the architecture of an inspection system (defect inspection system) according to a third embodiment of the present invention.

FIG. 3 is a drawing showing the architecture of an inspection system (defect inspection system) according to a third embodiment of the present invention. In this embodiment, electronic circuitry is used to binarize the image detected by the line sensor camera, and this binary image is captured to a PC. As a result, the load to the image input board is reduced and the need for image input boards operating at very high speeds is eliminated.

The inspected object 1 is supported on the work holder 2 fixed to the XY stage 3. The optical system 4 includes an illuminating optical system and an imaging optical system. The optical image obtained by the optical system 4 is converted to an image signal by the line sensor camera 5. For the line sensor camera 5, a TDI sensor camera equipped with an 8-output A/D converter is used. Eight-bit grayscale images are output in parallel through 8 channels at a data transfer rate of 10 MHz.

Eight shading correction circuits 20 . . . perform shading correction by channel on this digitized grayscale image signal. The shading correction cancels out sensitivity and illumination variations in the line image sensor pixels. A synthesis/division circuit 21 takes the shading-corrected image signals and provides partial overlaps with images from adjacent channels. Since the subsequent binarization circuit generates invalid pixels at the edges of the images, this provides a margin of invalid pixels beforehand.

Next, eight binarizing circuits 22 performs binary conversion for the channels. Binary conversion methods include binary conversion using fixed threshold values, binary conversion using floating threshold values, and binary conversion that emphasizes subtle contrasts using differential processing. The 8-channel bi-level image is then converted by a synthesis/packing circuit 23 into a single channel of packed data, i.e., 8-bit data with a data transfer rate of 10 MHz.

The bi-level image data converted with electronic circuits as described above is sent to the PC (PC-M) 8. In this embodiment, the sequence controller PC 8 also serves as the image input PC, and the PC 8 is equipped with an image input board 7. The image data goes through the image input board 7 of the PC 8 and is captured as a digital image in the main memory of the PC 8.

The PC 8 sends command signals from the stage controller (motor controller board) 9 to the driver 10. The driver 10 controls the stage drive motor and controls the movements of the XY stage 3 (the Y stage and the X stage). This allows bands of images to be detected while the Y stage is moved at a fixed speed in a direction (along the y axis) perpendicular to the arrangement of pixels in the line image sensor.

The entire surface of the inspected object 1 is detected by moving the Y stage back and forth. Each time the Y stage changes direction, the X stage is moved in incremental steps equal to the detection width.

The output pulse from an encoder connected directly to the shaft of the servo motor for the Y stage is sent to the camera control/coordinates management board 11. The board 11 performs frequency division on the encoder pulse and generates a pulse to drive the line image sensor. This is sent to the line image sensor. Also, by counting the pulse from the encoder, the board 11 manages position information for the XY stage 3. A trigger signal is generated based on the position information at the image detection starting point, and this is sent to the image input board 7.

Commands to the shading correction circuits 20, the synthesis/distribution circuit 21, the binarization circuits 22, the synthesis/packing circuit 23, and the board 11 are sent by the PC 8 through the command interface board 12.

The image sent to the PC 8 is selected/distributed appropriately by the PC 8 to the image processing PC group 18a, 18b, . . . 18n connected by the LAN 17. The image processing PCs 18a–18n operate in parallel to detect defects using the detected image data. The processing results (e.g., positions, sizes, types of defects) from the PC group 18a–18n are sent to the PC 8 through the LAN 17.

The sequencer 15, managed by the sequence controller PC 8, controls the work holder 2, the illumination light source 13, and the loader/unloader 14. The sequencer communicates with the PC 8 through a serial port 16 and operates in response to commands from the PC 8. Power to all the devices in the inspection system, except for at least the PCs, is supplied by a power supply controller 19.

PCs are used in the three embodiments described above, but the present invention is not restricted to PCs and any small-scale computers can be used. For example, workstations and servers can also be used. Also, besides using a plurality of desktop PCs or notebook PCs connected by a LAN, it would also be possible to use a plurality of motherboards mounted in a single case, with these motherboards connected by a network. An advantage of this method is that space can be conserved since the unit appears as a single case. In addition, the power supply, monitor, keyboard, mouse, and the like can be shared.

Also, in the embodiments above describe examples where the inspected object is moved using an XY stage. However, it would also be possible to move an optical system using an XY stage.

Figure 4:
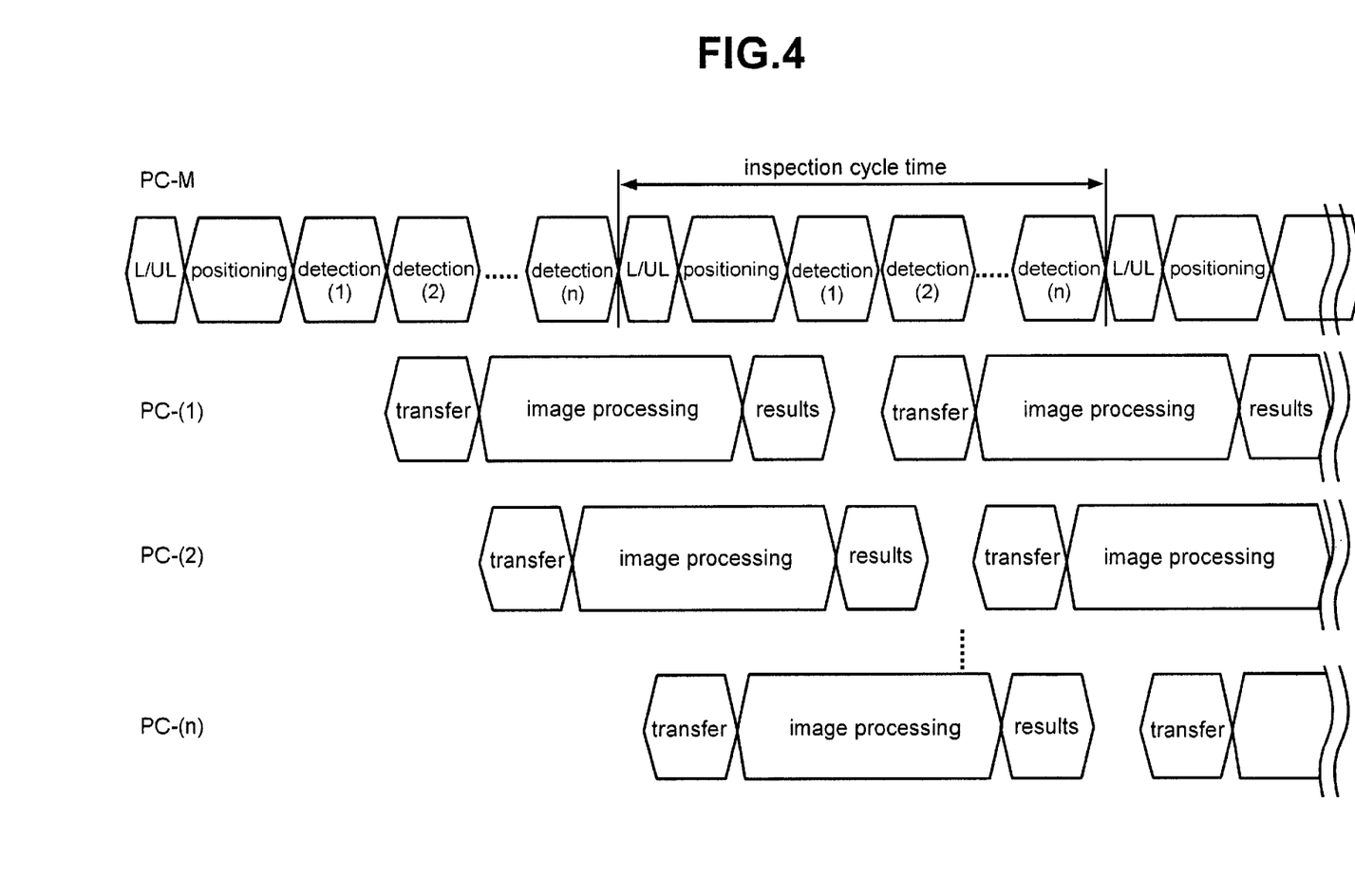
FIG. 4 is a drawing for the purpose of describing an example of a sequence of operations used in the first through the third embodiments of the present invention.

The following is a description, with references to FIG. 4, of an example of a sequence of operations used in the systems from the first through the third embodiments of the present invention.

Since the line image sensor detects a band-shaped region in a single scan, the X stage must be moved in an incremental step equal to the detection width for each Y stage scan. The entire surface of the inspected object is inspected by performing n stage scans with the Y stage.

The PC PC-M, which performs sequence control, first activates the loader/unloader to set up the inspected object on the work holder. Next, a positioning mark on the inspected object is detected, and positioning is performed. Then, n stage scans are performed and the image for the entire surface of the inspected object is detected. Once inspection of the entire surface is completed, the loader/unloader is activated again, the inspected object is removed from the work holder, and the next inspected object is set up. Thus, the inspection cycle starts with the activation of the loader/unloader and stops with the completion of the n-th stage scan.

n PCs are used as the image processing PCs, where n is the number of stage scans n. The image obtained from the first stage scan is transferred to a PC-(1), and the PC-(1) processes the image and evaluates it for defects. Once the evaluation operation is completed, the evaluation results are transferred to the PC-M.

Similarly, the image obtained from the k-th stage scan is evaluated for defects by a PC-(k). Each image processing PC-(k) completes the evaluation and the transferring of the evaluation results before the next k-th stage scan of the inspected object is begun. By distributing the processing performed for the inspected image over n PCs, the inspection cycle can be reduced to the time required for inspection. Of course the time involved in performing image processing and evaluation varies according to the type of inspection, the number of PCs can be increased or reduced as appropriate.

FIG. 4 shows an example where a single PC processes the image obtained from a single stage scan. However, for complex processing it would be possible to arrange a system where multiple PCs process the image obtained from a single stage scan. Conversely, if the processing is simple, the system can be arranged so that a single PC processes multiple stage scans.

Figure 5:
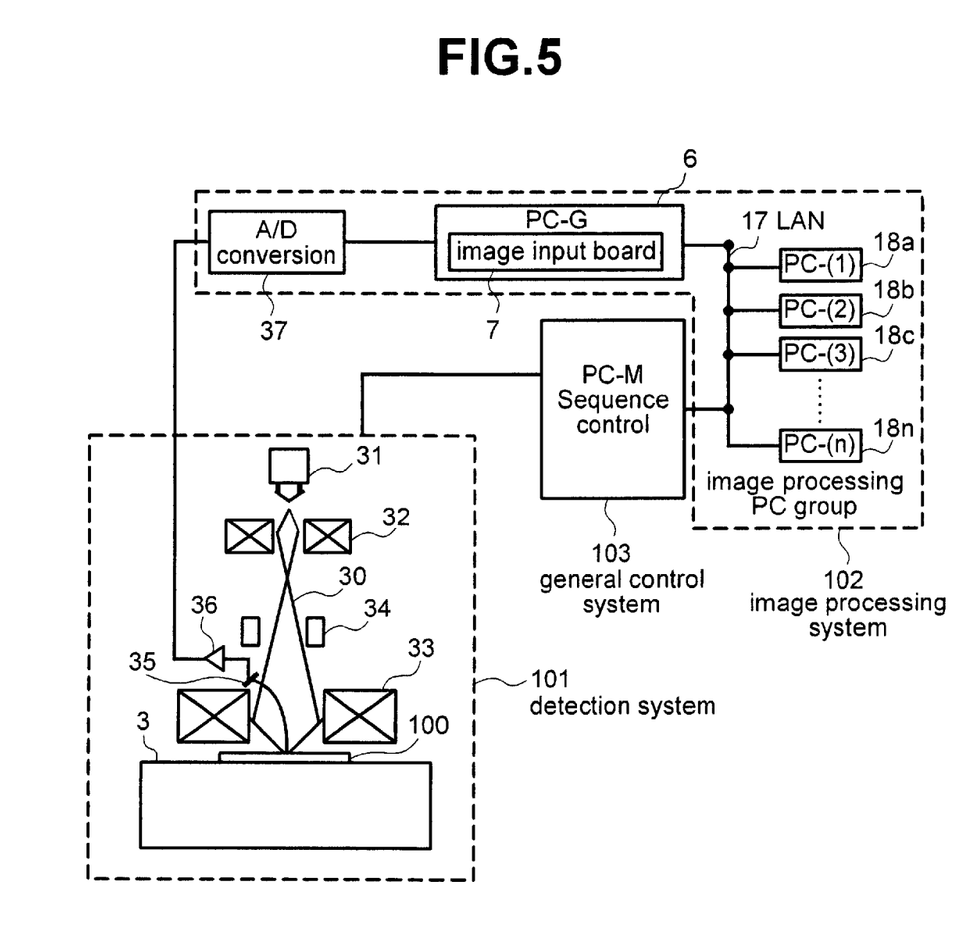
FIG. 5 is a drawing showing the architecture of an inspection system (defect inspection system) according to a fourth embodiment of the present invention.

FIG. 5 is a drawing showing the architecture of an inspection system (defect inspection system) according to a fourth embodiment of the present invention. This embodiment is an example of an implementation for a system used to inspect patterns on semiconductor wafers.

In this embodiment, an electron beam 30 scans a semiconductor wafer 100. An electron beam image for the scanned position is obtained based on intensity changes, and the electron beam image is used to perform pattern inspection.

Multiple chips are arranged on a semiconductor wafer, each chip ultimately becoming a single product. In the system of this embodiment, defects are recognized by performing image comparisons on the detected image for a chip and the detected image of a different, adjacent chip.

Broadly described, this system includes a detection system 101, an image processing system 102, and a general control system 103 controlling the entire system.

The general control system 103, which is formed from a single or a plurality of PCs (PC-M), controls the timing for various operations of the detection system 101 and the image processing system 102, keeps track of coordinates, and controls the series of inspection operations based on a pre-programmed sequence starting with the setting up of a semiconductor wafer and ending with sending out the inspection results.

The following is a description of the inspection system 101. An electron beam emitted from an electron gun 31 passes through a condenser lens 32 and an object lens 33. The beam diameter is reduced to about the pixel size on the sampling (wafer) surface. When the electron beam is applied, electrons are generated from the wafer 100. The electron beam is repeatedly scanned along the X axis using a scan deflector 34 while the stage 3 is successively moved along the Y axis of the wafer 100. By detecting the electrons that are generated in synchronization with these operations, a two-dimensional electron beam image of the wafer 100 is obtained. The electrons generated from the wafer 100 are captured by a detector 35, amplified by an amp 36, and sent to the image processing system 102.

In the image processing system 102, the incoming analog signal is converted to a digital signal by an A/D converter 37. The digitized image signal is captured by the image input PC (PC-G) 6. The PC 6 is equipped with the image input board 7. The image signal passes through the image input board 7 connected to the bus of the PC 6 and is captured as a digital image in the main memory of the PC 6. In this case, the image data rate is very fast at approximately 100 MHz–500 MHz, so the PC 6 must be equipped with a high-speed image input board.

The image data sent to the PC 6 is then sent to the image processing group 18a–18n connected by the LAN 17, and defect evaluation operations are performed. In the image processing PC group 18a–18n, image correction such as darkness level correction, correction for fluctuations in the electron beam source and shading correction is performed. Then, the detected image for a particular chip is aligned with the detected image for a different, adjacent chip, and defects are recognized by comparing the images.

The processing results (e.g., position, size, and type of defects) are sent through the LAN 17 to the general control system 103. The inspection results are sent to a printer or are transferred by the general control system 103 through the network to a computer outside the inspection system. The image processing PC group can be used to perform detailed categorizations and criticality evaluations for the defects in addition to detecting the defects.

Figure 6:
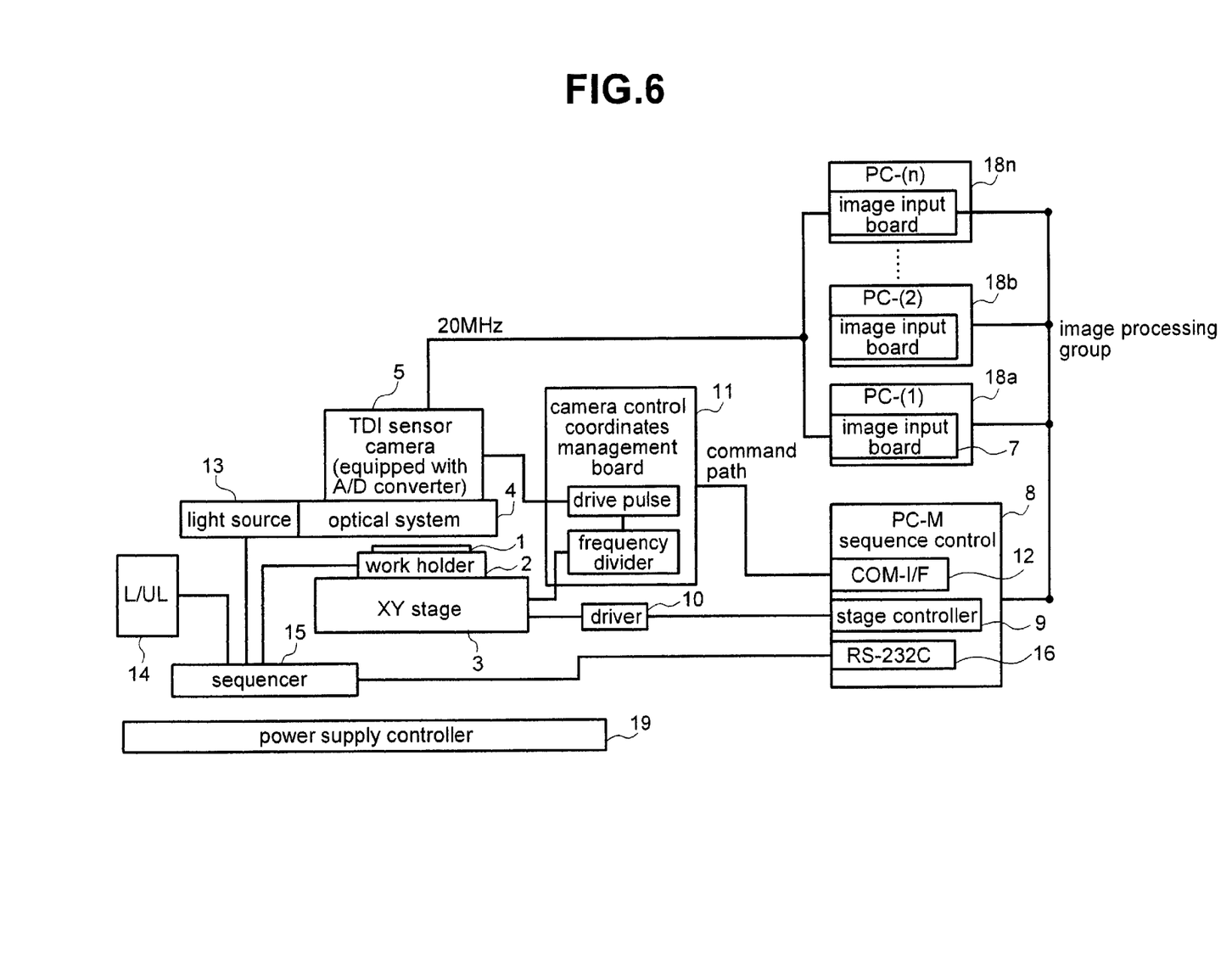
FIG. 6 is a drawing showing the architecture of an inspection system (defect inspection system) according to a fifth embodiment of the present invention.

FIG. 6 is a drawing showing the architecture of an inspection system (defect inspection system) according to a fifth embodiment of the present invention. In this embodiment, the image processing PCs are also used for image input.

In the architecture shown in FIG. 6, the inspected object 1, such as an electronic circuit board, is supported on the work holder 2 fixed to the XY stage 3. Movement of the XY stage 3 causes the inspected region of the inspected object 1 to change successively. The optical system 4 includes: an illuminating optical system illuminating the inspected region of the inspected object 1 using light applied from the light source 13; and an imaging optical system forming an optical image using the light (e.g., reflected light and diffuse light) from the inspected region. The imaging optical system then takes the optical image formed on the line (linear) image sensor of the line (linear) sensor camera 5 and converts it to an image signal using the line image sensor.

A standard CCD linear image sensor can be used for line image sensor that performs image detection in the line sensor camera 5. However, in this embodiment, a TDI (Time Delay & Integration) line image sensor (TDI sensor) is used for high-sensitivity image detection with high-speed relative scanning, thus providing image detection through high-speed scanning and allowing high-sensitivity image detection even with low illumination. The line sensor camera 5, which is equipped with an amplifier and an A/D converter, performs A/D conversion of the output from the line image sensor and outputs a digitized image signal.

The digitized image signal is captured by the image processing PC group (PC-(1), PC-(2), . . . PC-(n)) 18a, 18b, . . . 18n. Each of the PCs 18a, 18b, . . . 18n is equipped with an image input board 7. The image signal passes through the image input board 7 connected to the bus of the PC and is captured into main memory as a digital image. If a single output image sensor is used as the line image sensor in the line sensor camera 5, and the data transfer rate is no more than approximately 20 MHz, then commercially sold PC image input boards can be used.

Since the line image sensor detects band-shaped regions during one scan, the X stage is moved by incremental steps equal to the detection width for each scan of the Y stage. The entire surface of the inspected object can be inspected by performing n stage scans using the Y stage.

The image obtained from the first stage scan is detected and pre-processed (e.g., darkness level correction, shading correction) by the PC (PC-(1)) 18*a*, and then defect evaluation operations are performed. The results (e.g., position, size, type of defects) are sent through the LAN 17 to the PC (PC-M) 8. The image obtained from the second stage scan is detected and processed by the PC (PC-(2)) 18*b*. Images are successively assigned to and processed by the PCs. If the PC (PC-(1)) 18*a* has finished processing and has sent the processing results to the PC (PC-M) 8 by the k-th stage scan, then the PC (PC-(1)) 18*a* detects and performs defect evaluation on the image obtained from the k-th stage scan.

In FIG. 6, the PC (PC-M) 8 is a sequence controller PC and handles general administration of the entire system and provides unified control over the inspection sequence in the system.

The PC 8 sends command signals from its stage controller (motor control board) 9 to the driver 10. The driver 10 drives the stage drive motor and controls the movements of the XY stage 3 (the Y stage and the X stage). This allows bands of images to be detected while the Y stage is moved at a fixed speed in a direction (along the y axis) perpendicular to the arrangement of pixels in the line image sensor. The entire surface of the inspected object 1 is detected by moving the Y stage back and forth. Each time the Y stage changes direction, the X stage is moved in incremental steps equal to the detection width.

An output pulse from an encoder connected directly to the shaft of a servo motor used to drive the stage is sent to the camera control/coordinates management board 11. In the board 11, frequency division is performed on the encoder pulse, a pulse for driving the line image sensor is generated, and this pulse is sent to the line image sensor. Also, by counting the pulse from the encoder, the board 11 manages position information for the XY stage 3. A trigger signal is generated based on the position information at the image detection starting point, and this is sent to the image input board 7 of the PC 6. Commands sent to the board 11 are issued by the PC 8 through a command interface board 12.

In this embodiment, image data does not need to be transferred through the LAN to the image processing PC group, thus preventing network congestion. Also, grayscale image data including defect positions can be contained in the processing results sent to the sequence controller PC (PC-M).

Examples of objects that can be inspected by the inspection system (defect inspection system) of the present invention are described below.

The first example is circuit patterns of fine metal particles formed on green sheets used for ceramic substrates. Defects include defects in the flat pattern shape, e.g., broken lines, half-broken lines, shorts, and half shorts, and defects along the height axis of the pattern, e.g., low spots, pin holes (inadequate height), and projections (excess height).

The second example is copper circuit patterns formed on printed circuit boards. In particular, build-up boards use fine, dense patterns so even small defects must be detected. These patterns also have a high cross-section aspect ratio, so inspection of defects along the height axis of the patterns also becomes important. Defects include defects in the flat pattern shape, e.g., broken lines, half-broken lines, shorts, and half shorts, and defects along the height axis of the pattern, e.g., thin patterns, pin holes (inadequate height), and projections (excess height). Also, blind via holes and through holes are inspected as well.

In the third example, a flat display is inspected. For example, the present invention is suited for inspecting three-dimensional shapes, e.g., barrier height, barrier width, and phosphor thickness, and for inspecting the phosphor film in the barrier production process. The present invention can also be used to inspect projection defects in color filters and phosphor film thickness in cathode-ray tubes.

In the fourth example, soldering on printed circuit boards is inspected. For example, inspection is performed for misalignment and soldering defects in QFP, SOP, chips, and the like (e.g., bad wetting, inadequate solder, bridging).

In the fifth example, foreign matter on wafers is inspected. In this case, foreign matter (debris) on wafers with a mirrored finish or patterned wafers is inspected.

In the sixth example, inspection is performed on wafer patterns. The patterns formed on wafers are inspected.

The examples above are for applications related to electronic circuits, but the present invention can of course be implemented for products, semi-finished products, and parts from other fields.

The present invention, as described above, uses a line image sensor as a detector rather than a two-dimensional image sensor (TV camera). Thus, the need for time-consuming static time such as is required for two-dimensional image sensors is eliminated, and images can be detected efficiently through continuous scanning. Thus, a high-speed inspection system can be provided. Furthermore, image processing and defect evaluation are performed through software on small-scale computers (PCs). PCs, being general-purpose products, are inexpensive. This provides significant cost reduction in the set-up for handling image processing compared to the conventional method of producing dedicated image processing circuitry.

Also, the number of PCs to be used can correspond to the inspection speed that is required. Thus, processing power can be easily changed by adjusting the number of PCs. Also, development time is short and the evaluation processing algorithm can be easily changed. These factors make it possible to have a highly flexible inspection system. Also, since PC performance has been increasing rapidly, processing time can be reduced simply by replacing the PCs with the newest machines.

The invention may be embodied in other specific forms without departing from the spirit or essential characteristics thereof. The present embodiment is therefor to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. An inspection system comprising:
    a stage which mounts an object to be inspected and moves in a plane;
    an image detecting means for detecting an image of said object mounted on said stage successively moving in a plane and successively outputting an image signal;
    an image signal receiving means for receiving said image signal successively outputted from said image detecting means and outputting said received image signal;
    an image processing means which includes a plurality of image processing units which receive successive portions of said outputted image signal from said image signal receiving means, and process said received outputted image signal to detect defects in said object in parallel; and a data unifying means for unifying data which is processed by said image processing means in parallel, wherein said image receiving means outputs said received image signal by selectively distributing said successive portions of said received image signal to said plurality of image processing units of said image processing means.

2. An inspection system as described in claim 1 wherein said plurality of image processing units are formed from general-purpose PCs.

3. An inspection system as described in claim 1 wherein said image detecting means sends out an image signal as a multi-channel output, and said image signal receiving means includes a feature to receive multi-channel image signals.

4. An inspection system as described in claim 1 wherein said image detecting means has a line image sensor of the TDI (Time Delay & Integration) type that detects images of said inspected object.

5. An inspection system as described in claim 1 wherein said plurality of image processing units are connected to said image signal receiving means via a communication network.

6. An inspection system as described in claim 1 wherein said image detecting means detects an optical image of said inspected object.

7. An inspection system as described in claim 1 wherein said image detecting means captures a two-dimensional electron image of said inspected object.

8. An inspection system as described in claim 1 wherein said stage moves said object when said image detecting means is detecting images of said object.

* * * * *